United States Patent
Kawamura

(10) Patent No.: US 9,878,475 B2
(45) Date of Patent: Jan. 30, 2018

(54) TRANSFER MOLDING METHOD, MOLD, AND MOLDED ARTICLE

(71) Applicant: CANON KABUSHIKI KAISHA, Tokyo (JP)

(72) Inventor: Shogo Kawamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 515 days.

(21) Appl. No.: 14/561,643

(22) Filed: Dec. 5, 2014

(65) Prior Publication Data

US 2015/0165660 A1    Jun. 18, 2015

(30) Foreign Application Priority Data

Dec. 18, 2013    (JP) ................. 2013-261743

(51) Int. Cl.
| | |
|---|---|
| *B29C 45/02* | (2006.01) |
| *B29C 45/00* | (2006.01) |
| *B29C 45/16* | (2006.01) |
| *B29K 101/10* | (2006.01) |
| *B29L 22/00* | (2006.01) |
| *B29C 45/17* | (2006.01) |

(52) U.S. Cl.
CPC .............. *B29C 45/02* (2013.01); *B29C 45/16* (2013.01); *B29C 45/1759* (2013.01); *B29K 2101/10* (2013.01); *B29L 2022/00* (2013.01); *Y10T 428/1397* (2015.01)

(58) Field of Classification Search
CPC ..... B29C 45/02; B29C 45/16; B29C 45/1759; B29C 47/14; B29C 45/0062; Y10T 428/1397; B29L 2022/00; B29K 2101/10

USPC ........................................... 264/520; 425/112
See application file for complete search history.

(56) References Cited

U.S. PATENT DOCUMENTS

| | | | |
|---|---|---|---|
| 8,408,890 B2* | 4/2013 | Fukumoto | B29C 45/045 264/250 |
| 2004/0105909 A1* | 6/2004 | Tofukuji | B29C 43/36 425/116 |
| 2011/0175254 A1* | 7/2011 | Kroll | B29C 45/1671 264/232 |
| 2013/0230618 A1* | 9/2013 | Lee | B29C 45/26 425/588 |

(Continued)

FOREIGN PATENT DOCUMENTS

| | | |
|---|---|---|
| JP | 58-225642 A | 12/1983 |
| JP | 11-042670 A | 2/1999 |

OTHER PUBLICATIONS

Imamura et al., U.S. Appl. No. 14/553,019, filed Nov. 25, 2014.
Kawamura, U.S. Appl. No. 14/00,352, filed Apr. 30, 2015.

*Primary Examiner* — Nahida Sultana
(74) *Attorney, Agent, or Firm* — Fitzpatrick, Cella, Harper & Scinto

(57) ABSTRACT

There is provided a molding method for efficiently and accurately molding a hollow part of a thermosetting resin with a simple mechanism, a mold, and a molded article. A mold used for molding of a thermosetting resin includes an upper mold, an intermediate mold, and a lower mold which can be stacked with each other. Primary molding for molding segment parts and secondary molding for bonding the segment parts are sequentially performed by placing or retracting the intermediate mold to switch between a runner for primary molding and a runner for secondary molding.

12 Claims, 15 Drawing Sheets

(56) References Cited

U.S. PATENT DOCUMENTS

2015/0158217 A1\* 6/2015 Belzile ............... B29C 45/2725
264/328.19

\* cited by examiner

TRANSFER MOLDING METHOD, MOLD, AND MOLDED ARTICLE

BACKGROUND OF THE INVENTION

Field of the Invention

The present invention relates to a transfer molding method for molding a hollow molded article of a thermosetting resin, a mold, and a molded article.

Description of the Related Art

As a traditional technique of multi-cavity molding for molding a plurality of articles, a method is known which overlays a plurality of thin molds and uses a chamber penetrating the multiple molds to perform a plurality of steps within a single molding cycle (Japanese Patent Laid-Open No. S58-225642(1983)).

The molding method disclosed in Japanese Patent Laid-Open No. S58-225642(1983) uses multiple molds so that a plurality of segment parts can be molded within a single molding cycle. As a technique of bonding the segment parts, a method is known to insert the segment parts into separate devices to perform molding. However, the problem of this method is that it is difficult to align the segment parts to be bonded after they are removed from the molds.

SUMMARY OF THE INVENTION

An object of the present invention is to provide a molding method for efficiently and accurately molding a hollow part of a thermosetting resin with a simple mechanism, a mold, and a molded article.

Accordingly, a molding method of the present invention includes: a first mold clamping step, wherein an upper mold and a lower mold are clamped with an intermediate mold placed therebetween to form a first chamber, a first cavity and a first runner for primary molding between the upper mold and the intermediate mold, and a second cavity and a second runner for primary molding between the lower mold and the intermediate mold; a primary molding step, wherein a first molding material is transferred into the first cavity from the first chamber, through the first runner for primary molding, to form a first segment part, and the first molding material is transferred into a second cavity formed by fitting the lower mold to the intermediate mold, through the second runner for primary molding, to form a second segment part; a second mold clamping step, wherein the intermediate mold placed between the upper mold and the lower mold is retracted, and the upper mold and the lower mold are clamped, so as to form a second chamber serving as a portion of the first chamber, a third cavity surrounded by at least a portion of the first segment part and a portion of the second segment part, and a runner for secondary molding which is in communication with the third cavity; and a secondary molding step, wherein a second molding material is transferred into the third cavity from the second chamber through the runner for secondary molding to bond the first segment part and the second segment part.

According to the present invention, a molding apparatus provided with one resin transfer mechanism can sequentially perform primary molding for molding segment parts and secondary molding for bonding the segment parts. This can achieve a molding method for efficiently molding a hollow part of a thermosetting resin with a simple mechanism. Furthermore, since secondary molding can be performed without removing a molded article from a mold, the segment parts can be accurately bonded.

Further features of the present invention will become apparent from the following description of exemplary embodiments (with reference to the attached drawings).

DESCRIPTION OF THE EMBODIMENTS

First Embodiment

A transfer molding method, a mold, and a molded article according to a first embodiment of the present invention will now be described with reference to the attached drawings.

Figure 1A:
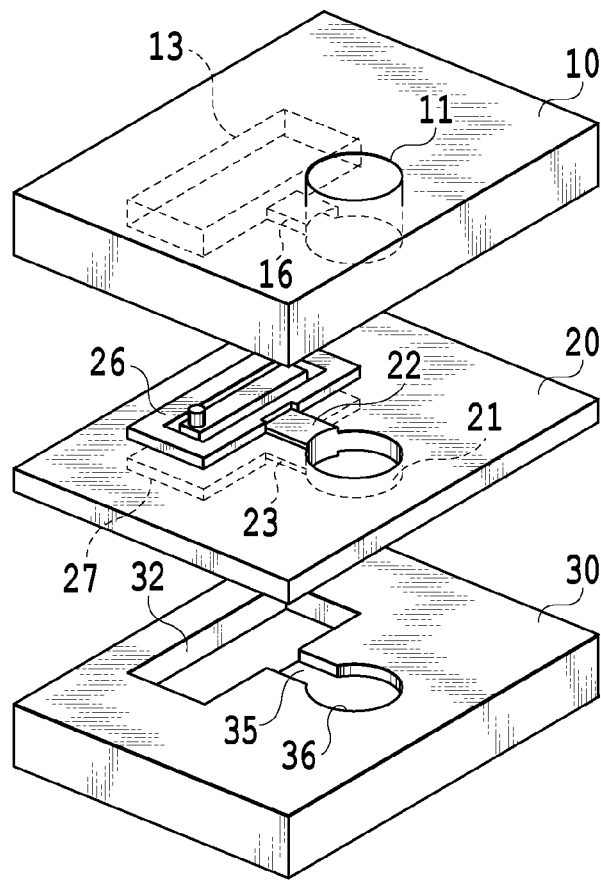
FIG. 1A is a view showing a mold to which a first embodiment can be applied.
Figure 1B:
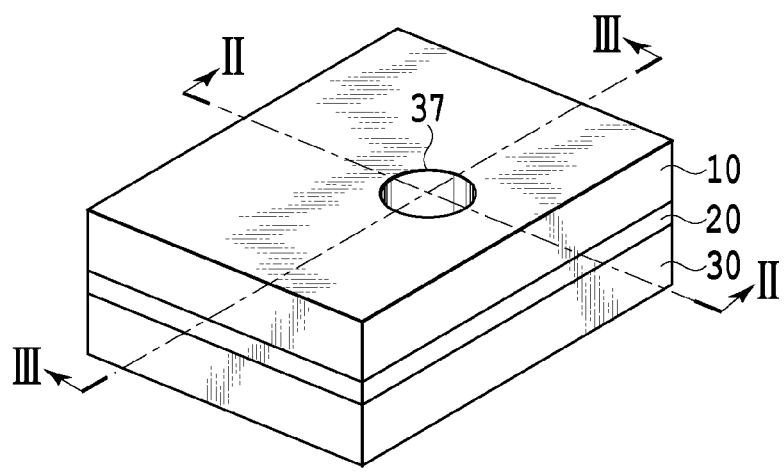
FIG. 1B is a view showing a mold to which the first embodiment can be applied.

FIGS. 1A and 1B show a mold to which the present embodiment can be applied. FIG. 1A is an exploded perspective view of a mold according to the first embodiment, and FIG. 1B shows a clamped state of the mold. A mold used for transfer molding consists of an upper mold 10, an intermediate mold 20, and a lower mold 30, which can be stacked with each other as shown in FIG. 1A. The upper mold has a first chamber 11 into which a thermosetting resin (molding material) is loaded, a channel 16, and a cavity 13 for forming a segment part.

The intermediate mold 20 has a second chamber 21 formed continuously to the first chamber 11 of the upper mold, and has a first core 26 and a first fitting portion 22 at the upper mold side and a second core 27 and a second fitting portion 23 at the lower mold side. The lower mold 30 has a channel 35, a cavity 32 for forming a segment part, and a third chamber 36.

When the upper mold 10, the intermediate mold 20, and the lower mold 30 are clamped, the first chamber 11, the second chamber 21, and the third chamber 36 are combined, and a chamber 37 is formed.

Figure 2:
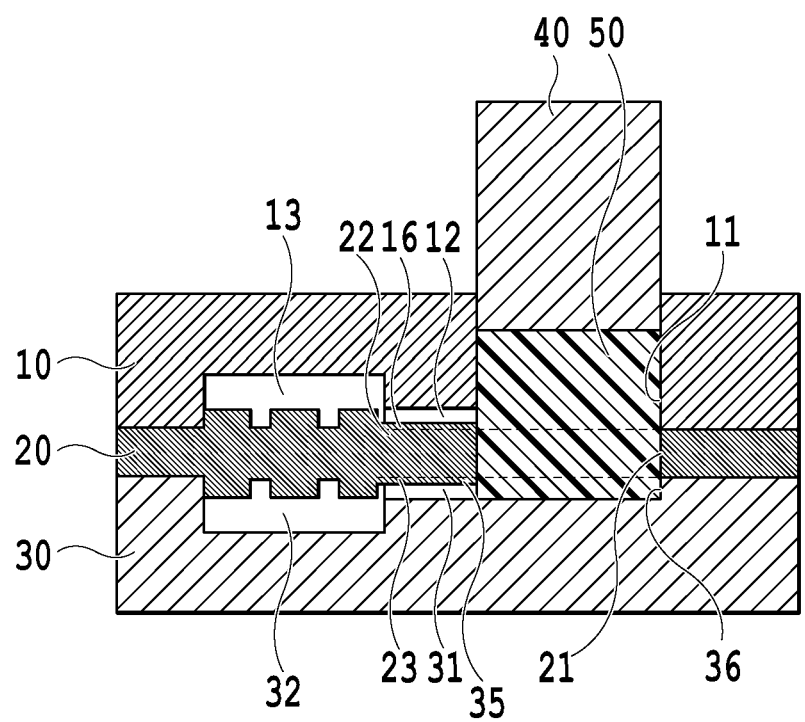
FIG. 2 is a cross-sectional view taken along line II-II of FIG. 1B.
Figure 3:
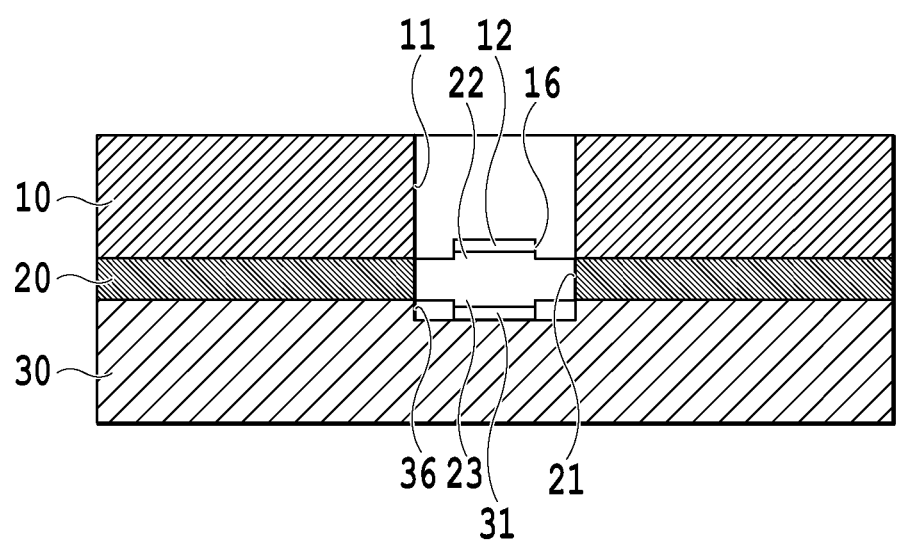
FIG. 3 is a cross-sectional view taken along line III-III of FIG. 1B.

FIG. 2 is a cross-sectional view taken along line II-II of FIG. 1B and illustrates a molding method according to the first embodiment of the present invention. FIG. 2 shows a state of primary molding before a resin is transferred. FIG. 3 is a cross-sectional view taken along line III-III of FIG. 1B and shows a state of the primary molding in which a mold is clamped. As shown in FIGS. 2 and 3, the first fitting portion 22 of the intermediate mold 20 is fitted into the channel 16 of the upper mold 10 and blocks about the lower half of the channel 16. The remaining space of the channel 16 defines a first runner 12 for primary molding.

In the same manner, the second fitting portion 23 of the intermediate mold 20 is fitted into the channel 35 of the lower mold 30 and blocks about the upper half of the channel 35. The remaining space of the channel 35 defines a second runner 31 for primary molding.

When the upper mold 10 and the intermediate mold 20 are combined, the first core 26 of the intermediate mold 20 is fitted into the cavity 13 of the upper mold 10, and a cavity for forming a first segment part is formed. Furthermore, when the lower mold 30 and the intermediate mold 20 are combined, the second core 27 of the intermediate mold 20 is fitted into the cavity 32 of the lower mold 30, and a cavity for forming a second segment part is formed.

To the chamber 37 (which is defined by the first chamber 11, the second chamber 21, and the third chamber 36) of the mold formed by combining the upper mold 10, the intermediate mold 20, and the lower mold 30, a thermosetting resin 50 for a single charge is loaded for molding. Then, the loaded thermosetting resin 50 is pressurized by a plunger 40 and transferred into the cavities 13 and 32.

The thermosetting resin 50 used in the present embodiment is an epoxy resin composition not containing an internal mold release agent such as wax, and it is preferable to apply a mold release agent to the mold before molding. A preferable mold release agent is a fluorine-based mold release agent since transfer to a molded article is less likely to occur. The thermosetting resin of the present embodiment contains 60% or more by volume of a silica filler. Since silica is closely packed, it is possible to perform molding with high dimensional accuracy. Molding can also be performed with high dimensional accuracy by containing a mica or alumina filler other than the silica filler. The temperature of the mold is set in the range of about 130° to 200° C. After being loaded into the chamber 37, the thermosetting resin 50 is left for about 5 to 10 seconds until the material is melted. Then, the thermosetting resin 50 is pressurized by the plunger 40.

Figure 4A:
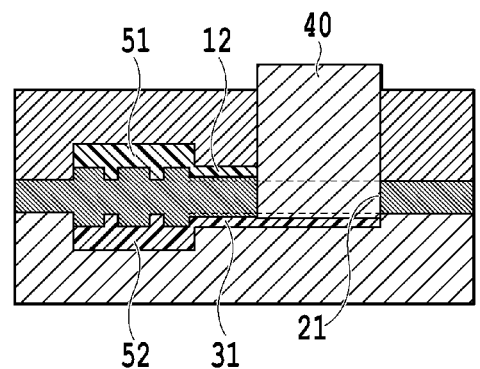
FIG. 4A is a cross-sectional view taken along line III-III of FIG. 1B in each step.

FIG. 4A is a cross-sectional view illustrating a state of primary molding after a resin is transferred. As shown in FIG. 4A, after being pressurized by the plunger 40, the melted thermosetting resin 50 goes through a first runner 12 for primary molding formed in the upper mold 10 and is transferred into the cavity 13. Likewise, the thermosetting resin 50 goes through a second runner 31 for primary molding formed in the lower mold 30 and is transferred into the cavity 32. At the same time, air in each cavity is discharged from a gap or the like between abutment surfaces of the molds. The thermosetting resin 50 cures in about 50 to 300 seconds in the heated molds. Then, a first segment part 51 is molded in the cavity 13 of the upper mold 10 and a second segment part 52 is molded in the cavity 32 of the lower mold 30.

The amount of the thermosetting resin 50 to be loaded for the primary molding is set such that after transferring all of the material, the plunger 40 penetrates the chamber 21 of the intermediate mold 20. Such an amount of the thermosetting resin 50 can prevent a cull from being left in the intermediate mold 20 when the mold is opened, and easy maintenance can be achieved.

Figure 4B:
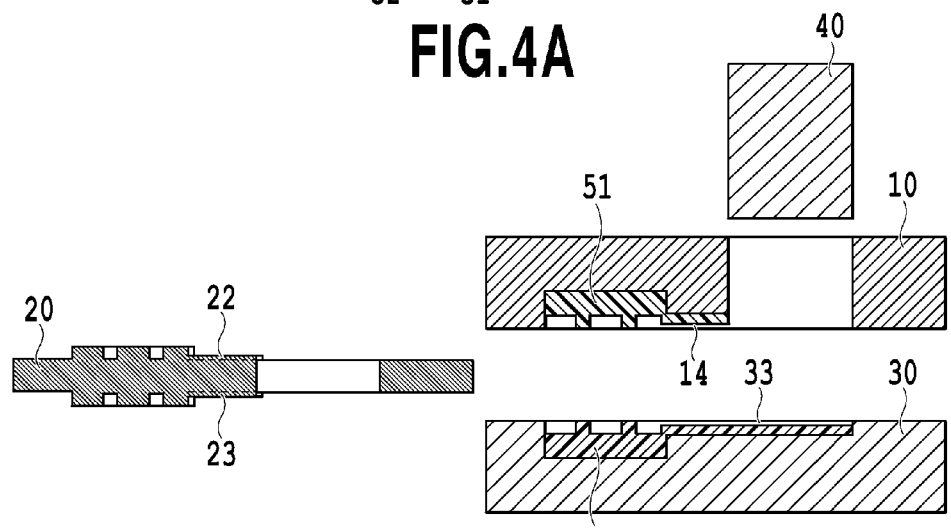
FIG. 4B is a cross-sectional view taken along line II-II of FIG. 1B in each step.

FIG. 4B is a cross-sectional view illustrating the state in which the intermediate mold 20 is retracted after the primary molding is completed. After the primary molding, the plunger 40, the upper mold 10, and the intermediate mold 20 are moved upwardly, and the mold is opened. At the same time, the first segment part 51 is left in the upper mold 10, and the second segment part 52 is left in the lower mold 30. This can be achieved by varying draft angles among the molds or by placing ejector pins. After the mold is opened, the intermediate mold 20 is retracted in a lateral direction. In the present embodiment, the lower mold 30 is a fixed mold and the upper mold 10 and the intermediate mold 20 are movable molds. However, the upper mold 10 may be set as a fixed mold and the intermediate mold 20 and the lower mold 30 may be set as movable molds.

Figure 4C:
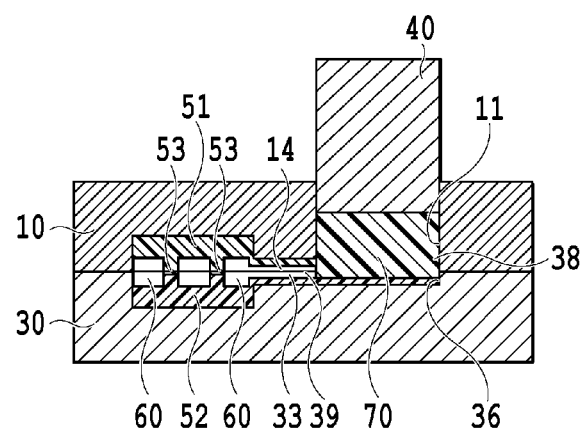
FIG. 4C is a cross-sectional view taken along line II-II of FIG. 1B in each step.
Figure 5:
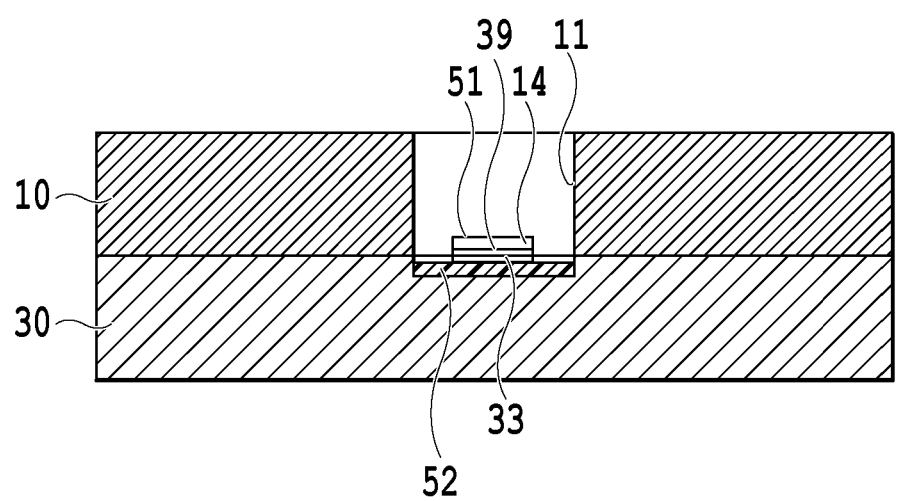
FIG. 5 is a cross-sectional view of a mold as viewed from a runner in secondary molding.

FIG. 4C is a cross-sectional view illustrating a state of secondary molding before a resin is transferred, and FIG. 5 is a cross-sectional view of a mold as viewed from a runner in secondary molding. When the upper mold 10 is moved downwardly and the upper mold 10 and the lower mold 30 are clamped, portions of the first segment part 51 and portions of the second segment part 52 abut each other, and the first and second segment parts, the upper mold 10, and the lower mold 30 form cavities 60. Furthermore, when the upper mold 10 and the lower mold 30 are clamped, a chamber 38 for secondary molding is formed which has defined a portion of the chamber 37 for primary molding.

Since the segment part 51 and the segment part 52 remain secured to the upper mold 10 and the lower mold 30, respectively, and the axis of the upper mold 10 while moving is the same as that in the primary molding, the segment part 51 and the segment part 52 accurately abut each other, and the cavities 60 are formed in a circular shape around abutment portions 53 of the segment parts.

When the mold is opened, the first fitting portion 22 of the intermediate mold 20 which has been fitted into the channel 16 of the upper mold is removed and the second fitting portion 23 of the intermediate mold which has been fitted into the channel 35 of the lower mold is removed. Then, when the intermediate mold 20 is retracted and the upper mold 10 and the lower mold 30 are clamped, the channel 14 into which the first fitting portion 22 has been fitted and the channel 33 into which the second fitting portion 23 has been fitted are combined, and a runner 39 for secondary molding which allows the chamber 38 to communicate with the cavities 60 is formed.

Incidentally, a description has been given of the configuration in which the runner 39 for secondary molding is defined by the channel 14 and the channel 33. However, a runner for secondary molding may be formed either on the upper mold 10 or the lower mold 30 as long as it allows the chamber 38 to communicate with the cavities 60. Then, a thermosetting resin 70 for bonding the first segment part 51 and the second segment part 52 is loaded into the chamber 38 and pressurized by the plunger 40 after melted. The thermosetting resin 70 for secondary molding has a preferable bonding property if the same material as the thermosetting resin 50 for primary molding is used. In the present embodiment, an epoxy resin composition which is the same material as the thermosetting resin for primary molding and which does not contain an internal mold release agent such as wax is used.

Figure 6:
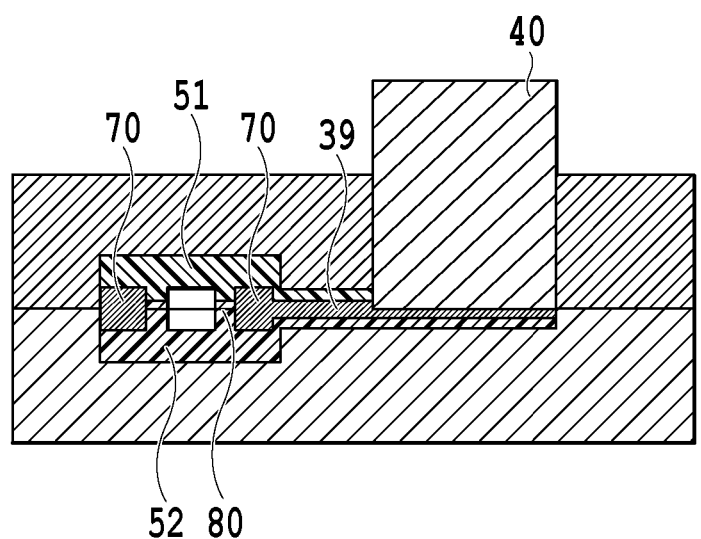
FIG. 6 is a cross-sectional view showing a state of secondary molding after a resin is transferred.

FIG. 6 is a cross-sectional view showing a state of secondary molding after a resin is transferred. After being pressurized by the plunger 40, the melted thermosetting resin 70 goes through the runner 39 for secondary molding and is transferred into the cavities 60. The thermosetting resin 70 cures in about 50 to 300 seconds in the heated molds like the resin in the primary molding, and the first segment part 51 and the second segment part 52 are bonded. Finally, the upper mold 10 and the lower mold 30 are opened and a hollow molded article 80 is retrieved.

Figure 7A:
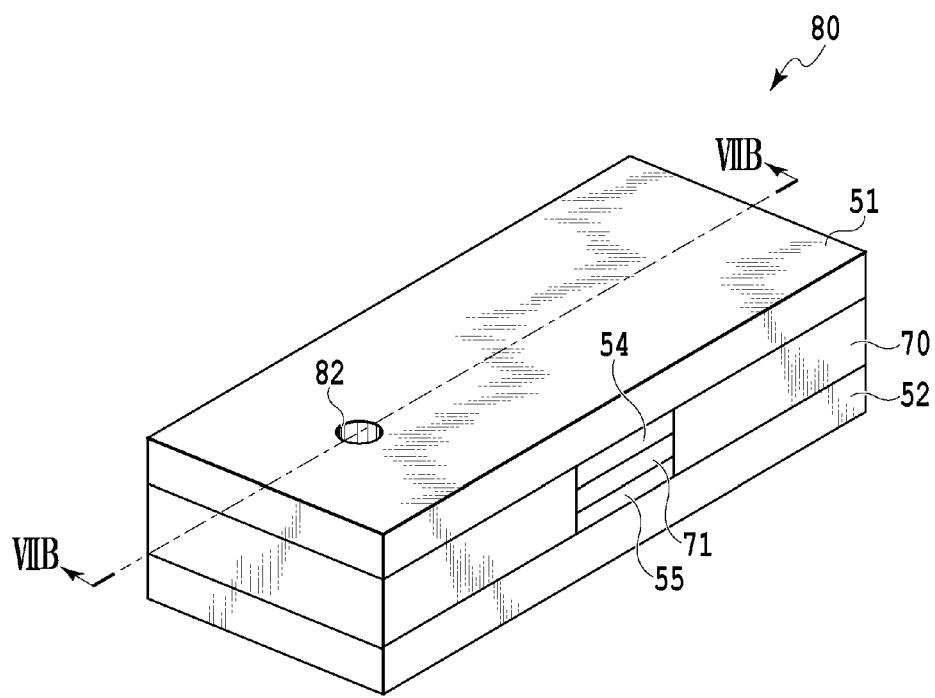
FIG. 7A is a perspective view of a hollow molded article.
Figure 7B:
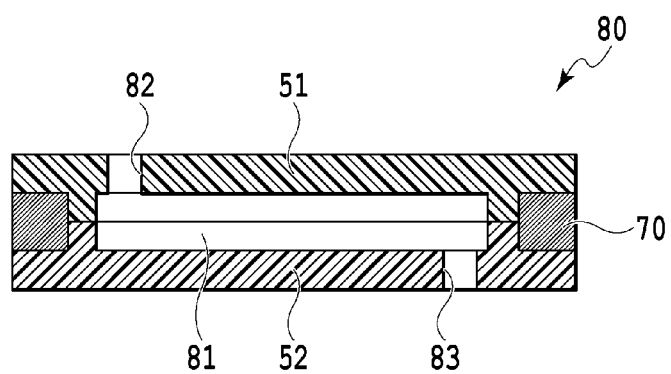
FIG. 7B is a cross-sectional view taken along line VIIB-VIIB of FIG. 7A.

FIG. 7A is a perspective view of the resulting hollow molded article 80, and FIG. 7B is a cross-sectional view taken along line VIIB-VIIB of FIG. 7A. The hollow molded article 80 retrieved from the mold becomes a final product after cutting a gate of the runner for primary molding and a gate of the runner for secondary molding. A first gate mark 54 of the runner for primary molding appears on a side surface near the first segment part 51, a second gate mark 55 on a side surface near the second segment part 52, and a third gate mark 71 on a portion corresponding to the runner for secondary molding.

As shown in FIG. 7B, a space 81 is formed inside the hollow molded article 80. Since the thermosetting resin used in the present embodiment is a material not containing an internal mold release agent such as wax, the cured segment parts of the primary molding and the thermosetting resin of the secondary molding are strongly bonded to each other. Accordingly, the hollow molded article 80 is provided with an inlet 82 and an outlet 83 on the first segment part 51 and on the second segment part 52, respectively, so as to be used as a liquid supply component.

Examples of the use of the hollow molded article include an ink supply member used inside an ink jet printer. The hollow molded article can also be preferably used for water purification such as a water purifier, a food and drink producing apparatus, medical related components, and the like. For use not requiring strong bonding, a thermosetting resin containing a mold release agent component may be used.

In this manner, a transfer molding apparatus provided with one resin transfer mechanism (a chamber and a plunger) can sequentially perform primary molding for molding segment parts and secondary molding for bonding the segment parts. This can achieve a molding method for efficiently molding a hollow part of a thermosetting resin with a simple mechanism. Furthermore, since secondary molding can be performed without removing a molded article from a mold, the segment parts can be accurately bonded to each other.

Second Embodiment

A second embodiment of the present invention will now be described with reference to the attached drawings. Since the basic configuration of the present embodiment is the same as that of the first embodiment, only the different features will be described.

Figure 8:
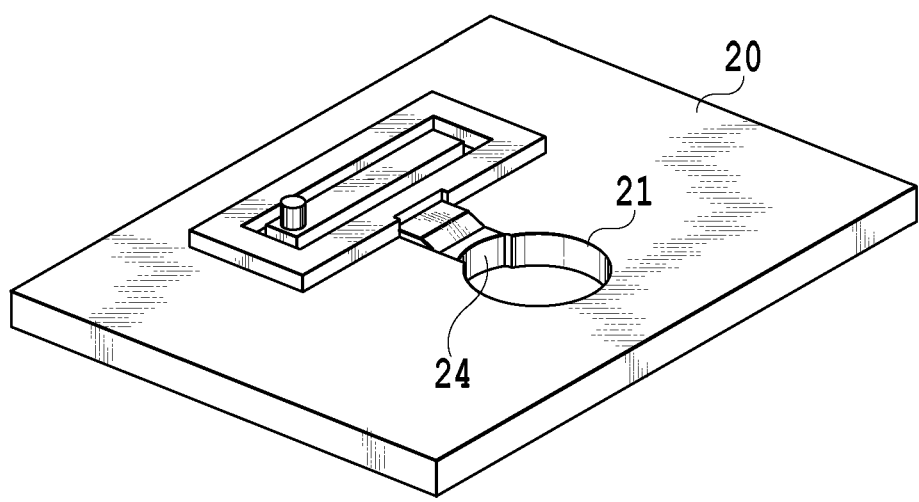
FIG. 8 is a perspective view illustrating an intermediate mold according to a second embodiment.

FIG. 8 is a perspective view illustrating an intermediate mold according to the second embodiment of the present invention. In the present embodiment, an intermediate mold 20 is provided with a channel 24 being adjacent to a chamber 21 of the intermediate mold 20 and extending in a pressurizing direction of a plunger 40.

Figure 9A:
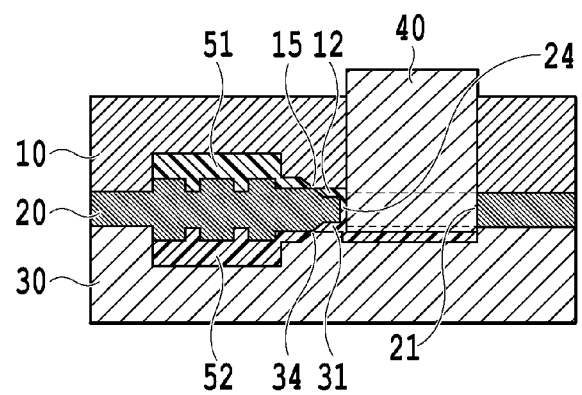
FIG. 9A is a cross-sectional view illustrating a state of primary molding.

FIG. 9A is a cross-sectional view illustrating a state of primary molding, and shows that the channel (a communication portion) 24 is provided through which a first runner 12 for primary molding and a second runner 31 for primary molding are in communication with each other. This structure allows the first runner 12 for primary molding and the second runner 31 for primary molding to be in communication with each other even after the plunger 40 passes by the first runner 12 for primary molding in primary molding.

As a result, it is possible to apply pressure for transfer for the same period of time to a thermosetting resin to be transferred into a cavity 13 and to a thermosetting resin to be transferred into a cavity 32. Accordingly, a first segment part 51 and a second segment part 52 to be molded can have substantially the same physical properties, and dimensional accuracy of a molded article can be further improved. In addition, it is possible to set the cavity 13 and the cavity 32 to have any volume.

In the present embodiment, separation portions 15 and 34 are provided in the middle of the runners 12 and for primary molding, respectively. In the present embodiment, at the point when the primary molding is completed, the first segment part 51 and the second segment part 52 are coupled via the intermediate mold 20. The separation portions are therefore formed to make changes to the runners at the middle to bend or thin a resin, so that a molded article desired to remain in each mold can be easily separated when the mold is opened.

Figure 9B:
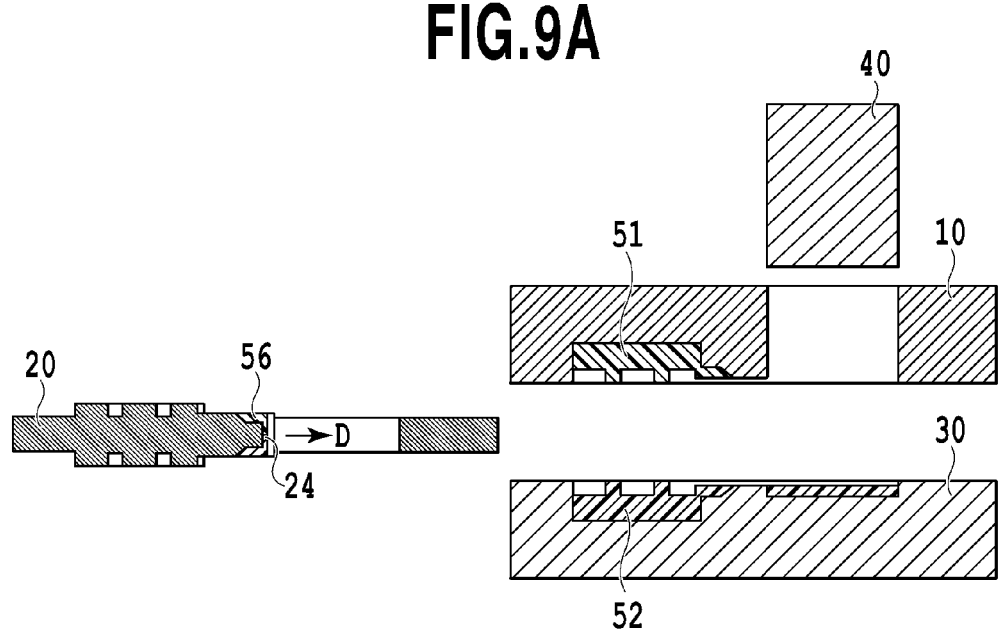
FIG. 9B is a cross-sectional view illustrating a state of primary molding.

FIG. 9B is a cross-sectional view illustrating a state in which the mold is opened and the intermediate mold 20 is retracted. After opening the mold, the first segment part 51 and the second segment part 52 connected via the channel 24 are split by the separation portions 15 and 34, and a cured resin 56 remains in the channel 24 of the intermediate mold 20. The cured resin 56 can be easily removed by being pulled out in a direction shown by an arrow D when retracting the intermediate mold. A hollow molded article can be molded by performing secondary molding as in the first embodiment.

In the present embodiment, the intermediate mold 20 is provided with the channel 24 being adjacent to the chamber and extending in a pressurizing direction of the plunger 40. However, examples of the configuration may include, but not limited to, any configuration as long as the runner 12 for primary molding and the runner 31 for primary molding are in communication with each other. For example, a through hole may be provided for the intermediate mold to allow the runner 12 for primary molding to communicate with the runner 31 for primary molding.

The same effect as that obtained in the first embodiment could be obtained in this configuration.

Third Embodiment

A third embodiment of the present invention will now be described with reference to the attached drawings. Since the basic configuration of the present embodiment is the same as that of the first embodiment, only the different features will be described.

Figure 10:
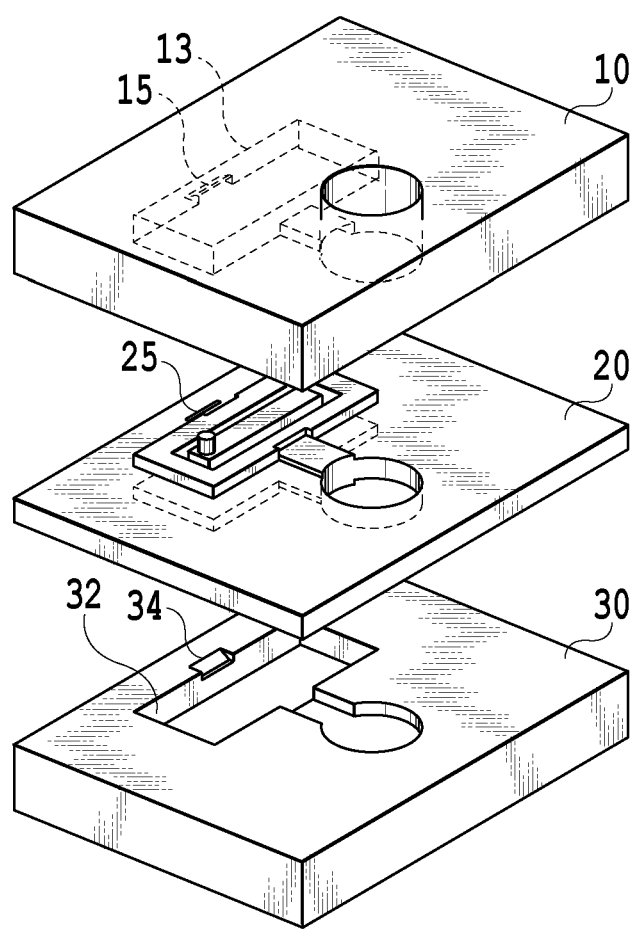
FIG. 10 is an exploded perspective view of a mold to which a third embodiment can be applied.
Figure 11:
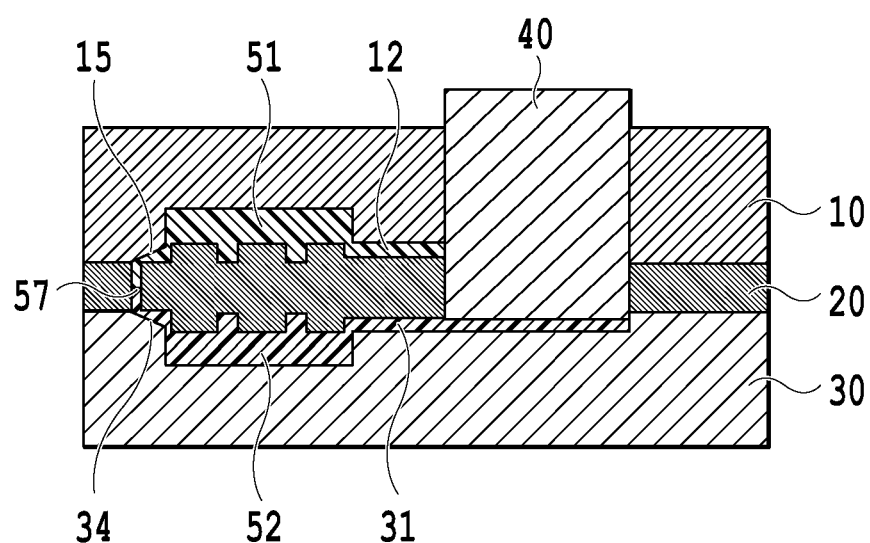
FIG. 11 is a cross-sectional view of a clamped mold and shows a state of primary molding.

FIG. 10 is an exploded perspective view of a mold to which a third embodiment of the present invention can be applied. FIG. 11 is a cross-sectional view of the clamped mold and shows a state of primary molding. In the present embodiment, a communication path (a communication portion) 25 is provided for an intermediate mold 20 so that a cavity 13 of an upper mold is in communication with a cavity 32 of a lower mold. Accordingly, a resin flowing from a runner 12 for primary molding into the cavity 13 flows into the communication path 25. A resin flowing from a runner 31 for primary molding into the cavity 32 for primary molding also flows into the communication path 25. Since the runner 12 for primary molding of the upper mold 10 is located higher than the runner 31 for primary molding of the lower mold 30, transfer of the thermosetting resin into the runner 12 for primary molding stops first.

However, since transfer into the cavity 13 and the cavity 32 which are in communication with each other via the communication portion 25 can be performed from the runner 31 for primary molding, pressure for transfer can be applied for the same period of time. Accordingly, primary molding can be performed as in the second embodiment, and a first segment part 51 and a second segment part 52 can have substantially the same physical properties. Furthermore, since separation portions 15 and 34 are provided in the upper mold side and the lower mold side, respectively, and the communication path 25 can be formed in a straight shape, a cured resin 57 remaining in the communication path 25 can be easily removed by ejection or the like.

Incidentally, the position of the communication path 25 is not limited to the above-described position. Examples of the position may include, but not limited to, any position at which the cavity 13 of the upper mold and the cavity 32 of the lower mold can be in communication with each other and at which a cured resin remaining in the communication path can be easily removed.

The same effect as that obtained in the first embodiment could be obtained in this configuration.

Fourth Embodiment

A fourth embodiment of the present invention will now be described with reference to the attached drawings. Since the basic configuration of the present embodiment is the same as that of the first embodiment, only the different features will be described.

Figure 12A:
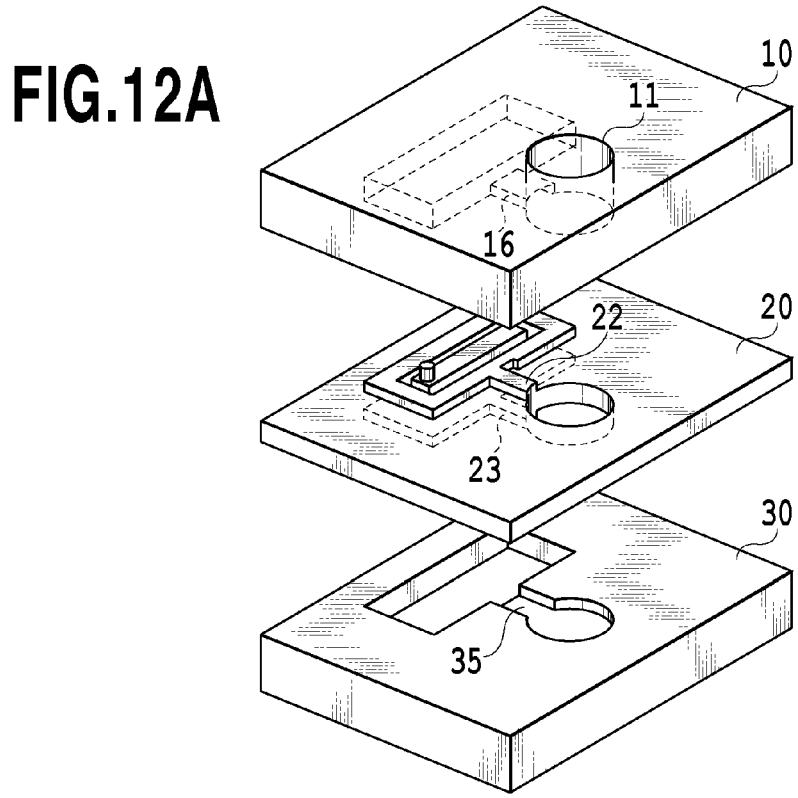
FIG. 12A is a view showing a mold to which a fourth embodiment can be applied.
Figure 12B:
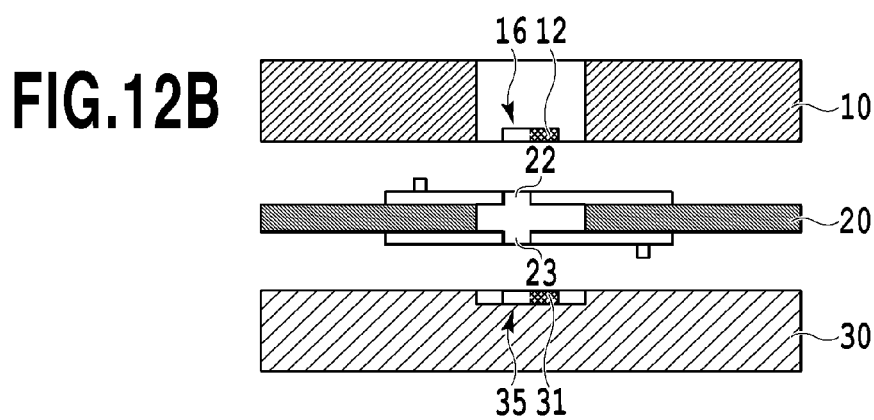
FIG. 12B is a view showing a mold to which the fourth embodiment can be applied.
Figure 12C:
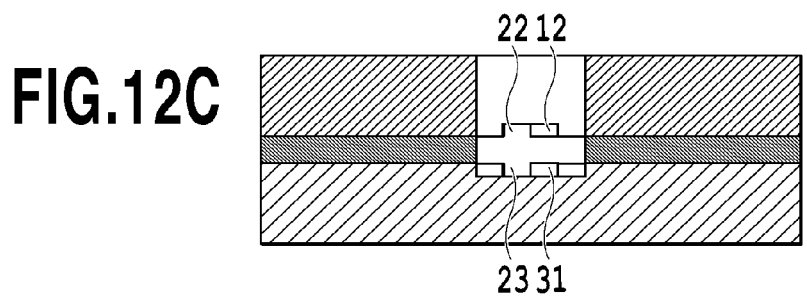
FIG. 12C is a view showing a mold to which the fourth embodiment can be applied.

FIG. 12A is an exploded perspective view of a mold to which the present embodiment can be applied. FIG. 12B is an exploded view of the mold as viewed from a chamber to a runner. FIG. 12C is a cross-sectional view of the clamped mold as viewed from a chamber to a runner.

In the first embodiment, about the upper half of the channel and about the lower half of the channel define the runners for primary molding that communicate from a chamber 37 to a cavity. In the present embodiment, runners for primary molding and fitting portions are disposed at the right side and the left side, respectively, and the right half of each channel is used as a runner for primary molding, whereas a runner for secondary molding is formed at the left side of each channel. More specifically, when the mold is clamped, a fitting portion 22 of an intermediate mold is fitted into the left side of the channel of an upper mold to form a first runner 12 for primary molding, whereas a fitting portion 23 of the intermediate mold is fitted into the left side of the channel of a lower mold to form a second runner 31 for primary molding.

Incidentally, the runners for primary molding and the fitting portions may be disposed either at the right side or at the left side. In view of flowability of a resin in secondary molding, however, it is preferable to dispose the fitting portion of the upper mold and the fitting portion of the lower mold at the same side.

The same effect as that obtained in the first embodiment could be obtained in this configuration.

Fifth Embodiment

A fifth embodiment of the present invention will now be described with reference to the attached drawings. Since the basic configuration of the present embodiment is the same as that of the first embodiment, only the different features will be described.

Figure 13A:
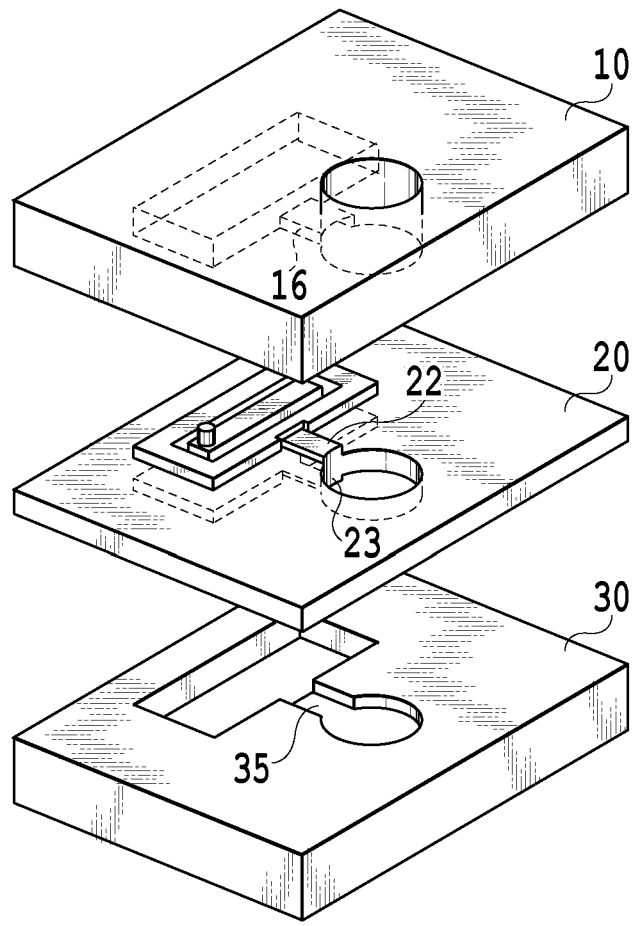
FIG. 13A is a view showing a mold to which a fifth embodiment can be applied.
Figure 13B:
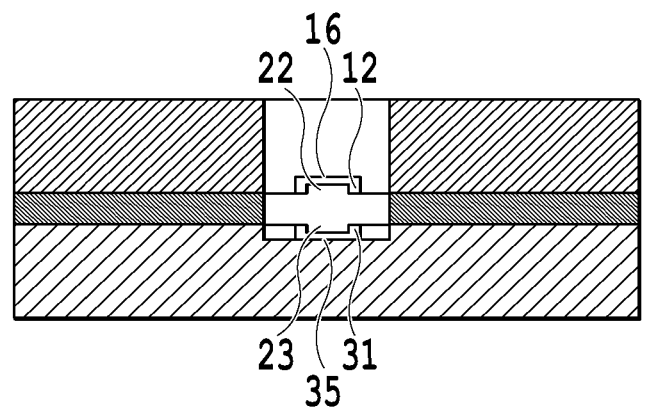
FIG. 13B is a view showing a mold to which the fifth embodiment can be applied.

FIG. 13A is an exploded perspective view of a mold to which the present embodiment can be applied. FIG. 13B is a cross-sectional view of the clamped mold as viewed from a chamber to a runner.

In the first embodiment, about the upper half of the channel and about the lower half of the channel define the runners for primary molding that communicate from a chamber to a cavity. The present embodiment shows an example in which fitting portions are disposed at the center and runners for primary molding are located around the fitting portions. A channel 16 is provided for an upper mold 10, and a fitting portion 22 having a width smaller than that of the channel 16 and having a height equal to about half the depth of the channel 16 is provided for an intermediate mold 20 near the center of the channel 16. Likewise, a channel 35 is provided for a lower mold 30, and a fitting portion 23 having a width smaller than that of the channel 35 and having a height equal to about half the depth of the channel 35 is provided for the intermediate mold 20 near the center of the channel 35.

The mold in the clamped state are shown in FIG. 13B, in which the center part of the channel 16 is blocked with the fitting portion 22, and a portion around the fitting portion 22 defines a first runner 12 for primary molding. Likewise, the center part of the channel 35 is blocked with the fitting portion 23, and a portion around the fitting portion 23 defines a second runner 31 for primary molding.

The same effect as that obtained in the first embodiment could be obtained in this configuration.

Sixth Embodiment

A sixth embodiment of the present invention will now be described with reference to the attached drawings. Since the basic configuration of the present embodiment is the same as that of the first embodiment, only the different features will be described.

Figure 14A:
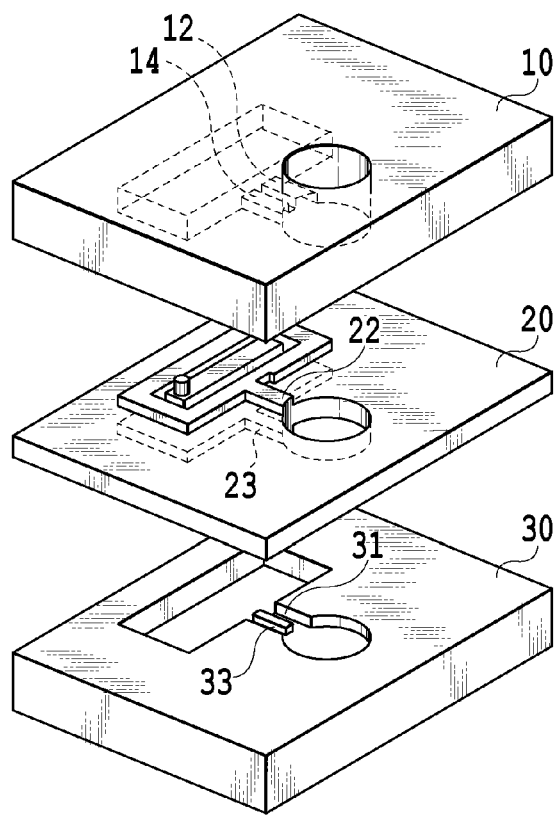
FIG. 14A is a view showing a mold to which a sixth embodiment can be applied.
Figure 14B:
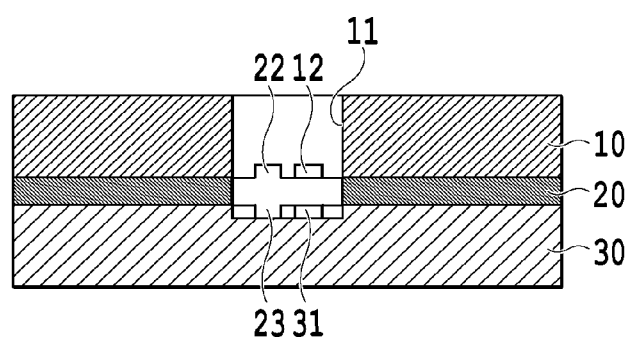
FIG. 14B is a view showing a mold to which the sixth embodiment can be applied.
Figure 14C:
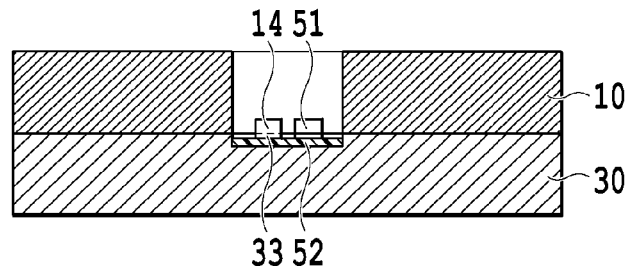
FIG. 14C is a view showing a mold to which the sixth embodiment can be applied.

FIG. 14A is an exploded perspective view of a mold to which the present embodiment can be applied. FIGS. 14B and 14C are cross-sectional views of the clamped mold as viewed from a chamber to a runner. FIG. 14B shows a state of primary molding, and FIG. 14C shows a state of secondary molding. In the first embodiment, the runner for primary molding and the runner for secondary molding are provided in one channel that communicates from a chamber to a cavity. In the present embodiment, runners 12 and 31 for primary molding and runners 14 and 33 for secondary molding are separated in different locations to define individual dedicated runners.

Of the runners for primary molding and the runners for secondary molding provided for an upper mold and a lower mold, the runners 14 and 33 for secondary molding are blocked with fitting portions 22 and 23 of an intermediate mold to perform primary molding. Then, after retracting the intermediate mold in the secondary molding, the runner for primary molding of the upper mold and the runner for primary molding of the lower mold are blocked with segment parts 51 and 52, respectively, and a bonding resin is transferred through the runners 14 and 33 for secondary molding to bond the segment parts. Incidentally, a runner for secondary molding may be formed either on the upper mold or the lower mold as long as the chamber is in communication with the cavity.

Figure 15:
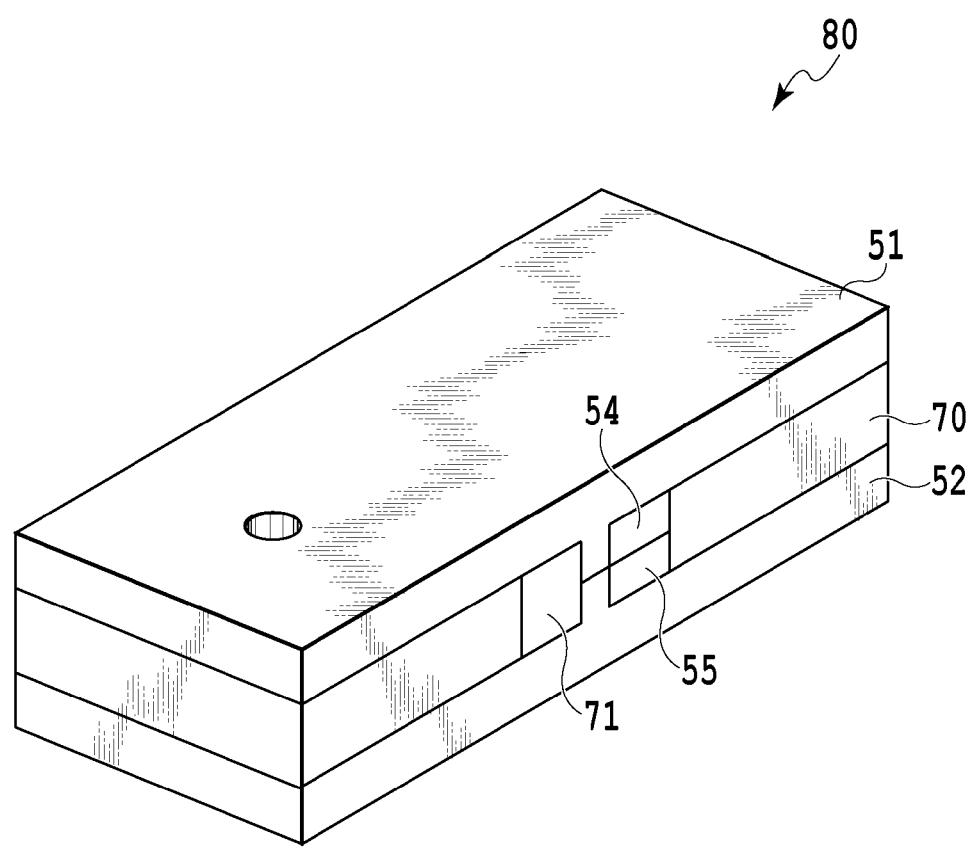
FIG. 15 is a perspective view of a hollow molded article completed according to the sixth embodiment.

FIG. 15 is a perspective view of a hollow molded article completed according to the sixth embodiment. A hollow molded article 80 retrieved from the mold becomes a final product after cutting a gate of the runner for primary molding and a gate of the runner for secondary molding as shown in FIG. 15. A first gate mark 54 of the runner for primary molding appears on a side surface near the first segment part 51, a second gate mark 55 on a side surface near the second segment part 52, and a third gate mark 71 on a portion corresponding to the runner for secondary molding. Splitting the gate for primary molding from the gate for secondary molding facilitates the cutting of the gates, thereby improving the efficiency of molding.

The same effect as that obtained in the first embodiment could be obtained in this configuration.

In each above embodiment, the method of molding by transfer molding is explained. However the present invention is not limited thereto. For example the present invention is applicable to a molding method such as injection molding and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261743, filed Dec. 18, 2013, which is hereby incorporated by reference wherein in its entirety.

What is claimed is:

1. A molding method for molding a thermosetting resin, the method comprising:
   a first mold clamping step, wherein an upper mold and a lower mold are clamped with an intermediate mold placed therebetween to form a first chamber, a first cavity and a first runner for primary molding between the upper mold and the intermediate mold, and a second cavity and a second runner for primary molding between the lower mold and the intermediate mold;
   a primary molding step, wherein a first molding material is transferred into the first cavity from the first chamber, through the first runner for primary molding, to form a first segment part, and the first molding material is transferred into a second cavity formed by fitting the lower mold to the intermediate mold, through the second runner for primary molding, to form a second segment part;
   a second mold clamping step, wherein the intermediate mold placed between the upper mold and the lower mold is retracted, and the upper mold and the lower mold are clamped, so as to form a second chamber serving as a portion of the first chamber, a third cavity surrounded by at least a portion of the first segment part and a portion of the second segment part, and a runner for secondary molding which is in communication with the third cavity; and
   a secondary molding step, wherein a second molding material is transferred into the third cavity from the second chamber through the runner for secondary molding to bond the first segment part and the second segment part.

2. The molding method according to claim 1, wherein the runner for secondary molding is formed both of a resin transferred into the first runner for primary molding and a resin transferred into the second runner for primary molding.

3. The molding method according to claim 1, wherein in the primary molding step, the first segment part and the second segment part are coupled at a communication portion.

4. The molding method according to claim 3, wherein the communication portion couples the first segment part with the second segment part along the first chamber.

5. The molding method according to claim 3, wherein after flowing into the first cavity and the second cavity, a resin flows into the communication portion to couple the first segment part with the second segment part.

6. The molding method according to claim 1, wherein the runner for secondary molding is formed separately from the first runner for primary molding and the second runner for primary molding.

7. The molding method according to claim 3, wherein a resin curing at the communication portion is removed when an intermediate mold is retracted.

8. The molding method according to claim 3, wherein a portion of a thermosetting resin curing in the first runner for primary molding and the second runner for primary molding is bent or thinned for curing.

9. The molding method according to claim 1, wherein a thermosetting resin not containing a mold release agent component is used for the resin.

10. The molding method according to claim 9, wherein an epoxy resin composition is used for the thermosetting resin.

11. The molding method according to claim 1, wherein molding of the thermosetting resin is performed by a transfer molding method.

12. A mold for molding a thermosetting resin, the mold comprising:
   an upper mold, an intermediate mold, and a lower mold which can be stacked with each other; and
   a first chamber formed by combining the upper mold, the intermediate mold, and the lower mold and a second chamber serving as a portion of the first chamber formed by combining the upper mold and the lower mold,
   wherein the upper mold has spaces defining:
   a first cavity formed by combining the upper mold and the intermediate mold;
   a first runner for primary molding formed by combining the upper mold and the intermediate mold, and being in communication with the first chamber; and
   a third cavity formed by combining the upper mold and the lower mold,
   wherein the lower mold has spaces defining:
   a second cavity formed by combining the lower mold and the intermediate mold;

a second runner for primary molding formed by combining the lower mold and the intermediate mold, and being in communication with the first chamber; and a third cavity formed by combining the lower mold and the upper mold, wherein at least one of the upper mold and the lower mold has a space defining a runner for secondary molding formed by combining the upper mold and the lower mold, wherein the second chamber is in communication with the runner for secondary molding and the third cavity, wherein the intermediate mold has a shape blocking the space defining the runner for secondary molding, wherein the space defining the first cavity and the space defining the second cavity are in communication with each other by combining the upper mold and the lower mold, and wherein the third cavity is provided across the space defining the first cavity and the space defining the second cavity.

\* \* \* \* \*